US009194763B2

(12) United States Patent
Hu et al.

(10) Patent No.: US 9,194,763 B2
(45) Date of Patent: Nov. 24, 2015

(54) OPTICAL TIME-DOMAIN REFLECTOMETRY SIGNAL DETECTION METHOD AND APPARATUS

(71) Applicant: Huawei Marine Networks Co., Ltd., Tianjin (CN)

(72) Inventors: Yingxin Hu, Shenzhen (CN); Guangjun Wang, Beijing (CN); Daizhen Chao, Shenzhen (CN)

(73) Assignee: Huawei Marine Networks Co., Ltd., Shenzhen (CN)

( * ) Notice: Subject to any disclaimer, the term of this patent is extended or adjusted under 35 U.S.C. 154(b) by 7 days.

(21) Appl. No.: 14/064,838

(22) Filed: Oct. 28, 2013

(65) Prior Publication Data

US 2014/0078506 A1    Mar. 20, 2014

Related U.S. Application Data

(63) Continuation of application No. PCT/CN2012/071418, filed on Feb. 22, 2012.

(30) Foreign Application Priority Data

Apr. 27, 2011 (CN) .......................... 2011 1 0106502

(51) Int. Cl.
*G01M 11/00* (2006.01)
*H04B 10/071* (2013.01)

(52) U.S. Cl.
CPC ...... *G01M 11/3118* (2013.01); *G01M 11/3127* (2013.01); *H04B 10/071* (2013.01); *H04B 2210/074* (2013.01)

(58) Field of Classification Search
None
See application file for complete search history.

(56) References Cited

U.S. PATENT DOCUMENTS

| 5,000,568 A | * | 3/1991 | Trutna et al. .......... 356/73.1 |
| H1626 H | | 1/1997 | Kersey et al. |
| 2009/0027656 A1 | | 1/2009 | Zhang et al. |

(Continued)

FOREIGN PATENT DOCUMENTS

| CN | 101729141 A | 6/2010 |
| CN | 101765763 A | 6/2010 |

(Continued)

OTHER PUBLICATIONS

"Correlation OTDR (C-OTDR)," (Aug. 5, 2005).

*Primary Examiner* — Gordon J Stock, Jr.
(74) *Attorney, Agent, or Firm* — Leydig, Voit & Mayer, Ltd.

(57) ABSTRACT

The present invention provides an optical time-domain reflectometry signal detection method, including the following steps: modulating, under the control of a correlation code pattern sequence respectively, n detection optical signals transmitted by detection light sources of different wavelengths into n pulse optical signals, where n is a natural number greater than or equal to 2; combining the n pulse optical signals and outputting a detection optical signal to an optical fiber under test; receiving a backscattered optical signal from the optical fiber under test and dividing the backscattered optical signal into n optical signals according to wavelengths; and performing correlation processing on the n optical signals according to the correlation code pattern sequence and outputting a correlation optical time-domain reflectometry signal. The present invention further provides an optical time-domain reflectometry signal detection apparatus.

2 Claims, 6 Drawing Sheets

(56) References Cited

U.S. PATENT DOCUMENTS

2011/0194853 A1  8/2011  Liu et al.
2013/0038879 A1* 2/2013  Dorize et al. ................. 356/445

FOREIGN PATENT DOCUMENTS

| FR | 2817960 A1 | 6/2002 |
|----|------------|--------|
| JP | 3596972 B2 | 12/2004 |

* cited by examiner

OPTICAL TIME-DOMAIN REFLECTOMETRY SIGNAL DETECTION METHOD AND APPARATUS

CROSS-REFERENCE TO RELATED APPLICATIONS

This application is a continuation of International Patent Application No. PCT/CN2012/071418, filed on Feb. 22, 2012, which claims priority to Chinese Patent Application No. 201110106502.9, filed on Apr. 27, 2011, both of which are hereby incorporated by reference in their entireties.

FIELD OF THE INVENTION

The present invention relates to the field of optical communication technologies, and in particular, to an optical time-domain reflectometry (Optical Time-Domain Reflectometry) signal detection method and apparatus.

BACKGROUND OF THE INVENTION

An optical time-domain reflectometer (OTDR, Optical Time-Domain Reflectometer) is made according to the back-scattering and reflection principles of light, where attenuation information is obtained by using backscattered light produced during light propagation in an optical fiber, and may be used to measure optical fiber attenuation and splice loss, locate an optical fiber fault point, and learn the loss distribution along the optical fiber. Because of the uneven density of optical fiber materials, uneven doping components, and defects of the optical fiber itself, when light is transmitted in the optical fiber, every point along the optical fiber will cause scattering. The optical time-domain reflectometer records the strength of scattered light which is collected at every time point. The speed of light is constant, and there is a mapping relationship between the time when a signal is collected and a transmission distance of light in the optical fiber; therefore, the time may be converted into the length of the optical fiber. FIG. 1 shows a typical expression form of an OTDR detection signal curve, where the horizontal axis indicates the length of an optical fiber (in km), and the vertical axis indicates the relative strength of scattered optical signals (in dB). It can be seen that, the height of the curve 100 gradually decreases as the length of the optical fiber increases; however, the change tends to be smooth. 104 indicates the strength difference of OTDR detection signals at two points resulting from different lengths of the optical fiber. The curve 100 changes significantly at the splice point (Splice) 101, optical fiber connection box (Connection) 102, and break point (break) or end of optical fiber (End of fiber) 103, which indicates that light is reflected or scattered at these places. The scattered light and reflected light may be partially transmitted back to the optical time-domain reflectometer. The areas of significant changes (105, 106, and 107) of the curve in FIG. 1 are referred to as reflection events and attenuation events. Transmission characteristics of the optical fiber at the places may be determined depending on the strength changes of the received light.

The conventional OTDR measurement principle is as follows: A pulse optical signal with a controllable width is coupled into an optical fiber; during the transmission process of the pulse light in the optical fiber, as scattering occurs, part of scattered signals in a direction opposite to the pulse transmission finally return to the OTDR. The OTDR receives the signals by using a coupler and performs analog-digital conversion to convert the signals into digital signals. The digital signals are converted into a curve where the length of the optical fiber (in km) is the horizontal axis and the relative strength (in dB) is the vertical axis. The curve is a straight line which starts from the origin of the optical fiber and gradually attenuates as the length of the optical fiber increases. However, due to phenomena of splices and breaks in the optical fiber, additional loss and reflection occur at these places, and the expression form thereof is shown by the reflection events and attenuation events in FIG. 1. OTDR measurement analyzes the state of an optical fiber link depending on the curve 100 having reflection and attenuation events. An exception is indicated if there is too strong reflection or too much loss at some places; because the horizontal axis of the curve is the length of the optical fiber, the places of the reflection and attenuation events may be calculated.

The OTDR measures the scattered signal of light. The scattered signal of the light is related to the peak power and pulse width of the detection pulse light, and decreases as the transmission distance increases. The scattered signal of the light is very weak in strength and may easily be covered by noise, which limits the detection distance of the OTDR. The detection distance corresponds to an indicator "dynamic range." "Dynamic range" is used to represent the maximum detection distance of the OTDR. The "dynamic range" is commonly defined by a dB difference between a backscattered signal level at the origin and a peak level of noise. Common methods for improving the dynamic range are increasing averaging times, increasing the detection pulse width, and using digital filtering technologies.

In order to obtain a better signal-noise ratio (that is, to improve the dynamic range and extend the detectable distance), normally, the multi-time accumulation technology (also referred to as averaging) is used. The implementation process of the multi-time accumulation technology is as follows: An OTDR controls a laser to send a pulse signal into an optical fiber. The pulse signal constantly produces backscattered signals during transmission in the optical fiber, which return to the OTDR with a coupler. The OTDR constantly receives the backscattered signals since the moment the pulse is sent. The OTDR performs photoelectric conversion, signal amplification, and analog-digital conversion on the received backscattered signals and stores them. Normally, this process continues until a scattered signal produced by the detection pulse signal at the end of the optical fiber returns to the OTDR instrument, that is, a period twice the time when the detection pulse is transmitted in the entire optical fiber (because there is a process for the backscattered signal to return, the transmission time doubles that for forward transmission). This process is referred to as OTDR sampling. This process is repeated and data obtained at multiple sampling times is accumulated and averaged, which may suppress white noise and improve the signal-noise ratio of OTDR signals. FIG. 2a shows an OTDR measurement result with a small number of averaging times, and FIG. 2b shows an OTDR measurement result with a large number of averaging times. The horizontal axes of the two figures represent the length of an optical fiber (in km), and the vertical axes are the relative strength (in dB) of sampled data. By comparing FIG. 2a with FIG. 2b, it can be seen that the locations where areas of sharp changes occur in FIG. 2a and FIG. 2b are basically the same; however, in FIG. 2b, the differences between the areas of sharp changes and other parts are more obvious, indicating that the dynamic range is improved after the number of averaging times is increased.

FIG. 3 is a schematic structural block diagram of an OTDR. A pulse generator 303 transmits a narrow pulse of an adjustable width to drive a laser 301, and the laser 301 generates pulse light of a required width. In FIG. 3, the graph above the arrow from the laser 301 to a coupler 302 is a schematic waveform of the pulse light. The pulse light goes through the coupler 302 for directional coupling and then enters an optical fiber 308 under test. Backscattered light and Fresnel reflected light in the optical fiber 308 go through the coupler 302 and enter a photoelectric detector 305. The photoelectric detector 305 converts the received scattered optical signal and reflected optical signal into electrical signals, which are amplified by an amplifier 306 and then sent to a signal processing component 307 for processing (including a sampling unit, an analog-digital conversion unit, and an averaging unit). The processing result is displayed by a displaying unit 309, where a vertical axis represents a power level and a horizontal axis represents a distance. A time base and controlling unit 304 controls the width of the narrow pulse of an adjustable width transmitted by the pulse generator 303, and controls the sampling of the sampling unit and the averaging of the averaging unit in the signal processing component 307.

A submarine cable monitoring device is a device for performing routine maintenance and fault location for submarine cables, and also uses the OTDR technology. A submarine cable monitoring device sends detection light into a submarine cable, and detects operating states of a submarine cable and a submarine device such as a repeater by using the received Rayleigh backscattered signal of the detection light. In a different scenario, a submarine cable system has a specific value range limit on the detection light power and signal pulse width, and the signal pulse width must be limited within a specific range in order to obtain effective monitoring accuracy. Therefore, how to obtain a bigger dynamic range and higher monitoring accuracy under the circumstance of limited detection signal power and pulse width becomes a difficult problem to be solved for the submarine cable monitoring device.

Because a submarine cable system is a cascade system having multiple repeaters, it has optical fiber transmission in two directions, namely, uplink and downlink, and a repeater amplification system. Every repeater of the submarine cable system has a loopback function, which ensures that a backscattered signal generated by a detection pulse can be coupled into a reverse transmission line and be sent back to the submarine cable monitoring device. The expression form of an OTDR signal in the submarine cable system is shown in FIG. 4, where the horizontal axis is the length of the submarine cable and the vertical axis is the relative strength of the OTDR signal. The place of every peak value corresponds to a repeater and an amplifier. The maximum detection distance of the OTDR signal is 600 km. Hence, the signal at the distance of 600 km is expressed as noise.

The OTDR described above performs detection by using single-pulse detection light. If the OTDR extends the single-pulse detection light into pulse sequence detection light and further uses the correlation between pulse sequences, it is referred to as a correlation OTDR (Co-relation OTDR). The correlation OTDR transmits the pulse sequence detection light and performs a correlation operation on a received scattered signal. Such correlation processing may effectively improve the signal-noise ratio of the received signal. By transmitting a pulse sequence, the signal-noise ratio may be improved under the circumstance that a single pulse in the detection pulse light sequence is narrow enough, thereby effectively solving the conflict between an optical fiber event resolution and the dynamic range, and improving the detection performance.

FIG. 5 is a schematic structural block diagram of a correlation OTDR in the prior art, where solid line arrows between modules represent optical signals and dashed line arrows between modules represent electrical signals. A code pattern generator 505 is configured to generate a pulse sequence (the graph above the arrow from the code pattern generator 505 to a correlation processing unit 507 is a schematic diagram of the waveform thereof). The pulse sequence is sent to a modulator 502 which modulates laser light transmitted by a laser 501 into pulse sequence detection light (the graph above the arrow from the modulator 502 to a coupler 503 is a schematic diagram of the waveform thereof). The pulse sequence detection light goes through the coupler 503 for directional coupling and then enters an optical fiber 504. The reflected light and scattered optical signal collected by the coupler 503 are converted into an electrical signal by a photoelectric detection unit 506, processed by the correlation processing unit 507, and then output to a display device (not shown in FIG. 5) for displaying the analysis result (the graph above the arrow to the right of the correlation processing 507 is a schematic diagram of the waveform thereof).

The biggest difference of the measurement principle between the correlation OTDR and the conventional OTDR described above lies in that, in this technology, instead of a pulse, a pulse sequence is transmitted in "every sampling process." The pulse sequence is designed for correlation operation. At present, the most popular correlation code pattern is Gray codes which consist of four groups of codes. The Gray codes are expressed as code strings consisting of 0 and 1 in number. The signal transmitted by a laser is continuous light. Under the control of a code pattern generator, a modulator modulates the continuous light into a form of a group of Gray code sequences. This group of Gray codes goes through a coupler and then enters an optical fiber for transmission. A receiving and sampling process continues until this group of codes is completely transmitted from the end of the optical fiber and the backscattered signal thereof completely returns to an OTDR instrument, thereby completing "one sampling process" of "one group of Gray codes". Normally, four groups of Gray codes need to undergo such a process of sampling sequentially, and finally four groups of sampled data are obtained. Correlation operation is respectively performed on the four groups of sampled data with the digital Gray codes generated by the code pattern generator, and data is regrouped, which still can be restored into the backscattered signal form obtained by a conventional OTDR sending a single pulse. The difference lies in that the digital correlation processing is capable of suppressing noise and improving the signal-noise ratio, and the OTDR signal is improved.

The disadvantage of the existing correlation OTDR technology lies in a heavy operation load, making it difficult to implement real-time processing. As described above, four groups of Gray codes need to be respectively transmitted, received, and stored, and a correlation operation is performed after the detection signals of the four groups of codes are completely received for restoring to OTDR signals. In a submarine cable system, normally the total length of cables is very large (some cables may reach a length of 12000 km), and a huge amount of data needs to be processed. In particular, some correlation code patterns require hundreds of code groups to be transmitted. Under such a circumstance, it is difficult for a submarine cable monitoring device to realize real-time processing and display states of submarine cables in real time.

SUMMARY OF THE INVENTION

The present invention provides an optical time-domain reflectometry signal detection method and apparatus capable of transmitting multiple groups of pulse sequences in parallel and simultaneously processing multiple groups of signals, thereby improving correlation processing efficiency.

An embodiment of the present invention proposes an optical time-domain reflectometry signal detection apparatus, including: n detection light sources of different wavelengths, and n modulators, a multiplexer, a coupler, a demultiplexer, a correlator, and a code pattern generator, where n is a natural number greater than or equal to 2;

the code pattern generator is configured to generate a correlation code pattern sequence, and input the correlation code pattern sequence respectively to the n modulators and the correlator;

each of the modulators is configured to modulate a detection optical signal transmitted by a corresponding detection light source into a pulse optical signal;

the multiplexer is configured to combine n pulse optical signals transmitted by the n modulators and output a detection optical signal;

the coupler is configured to perform directional coupling on the detection optical signal output by the multiplexer and then send it to an optical fiber under test; and receive a backscattered optical signal from the optical fiber under test and send the backscattered optical signal to the demultiplexer;

the demultiplexer is configured to divide the backscattered optical signal from the coupler into n optical signals according to wavelengths; and the correlator is configured to perform, according to the correlation code pattern sequence from the code pattern generator, correlation processing on the n optical signals output by the demultiplexer and output a correlation optical time-domain reflectometry signal.

An embodiment of the present invention further proposes an optical time-domain reflectometry signal detection method, including the following steps:

modulating, under the control of a correlation code pattern sequence respectively, n detection optical signals transmitted by detection light sources of different wavelengths into n pulse optical signals where n is a natural number greater than or equal to 2;

combining the n pulse optical signals and outputting a detection optical signal to an optical fiber under test;

receiving a backscattered optical signal from the optical fiber under test and dividing the backscattered optical signal into n optical signals according to wavelengths; and performing correlation processing on the n optical signals according to the correlation code pattern sequence and outputting a correlation optical time-domain reflectometry signal.

Based on the above technical solutions, n pulse optical signals of different wavelengths are output to an optical fiber under test, a backscattered optical signal may be divided into n backscattered signals according to wavelengths, and correlation processing is performed between the n backscattered signals, thereby realizing the objective of simultaneously transmitting multiple groups of pulse sequences in parallel and simultaneously processing multiple groups of signals. The solutions of the present invention are capable of greatly improving correlation processing efficiency and achieving the technical effect of real-time OTDR signal detection.

DETAILED DESCRIPTION OF THE EMBODIMENTS

Figure 1:
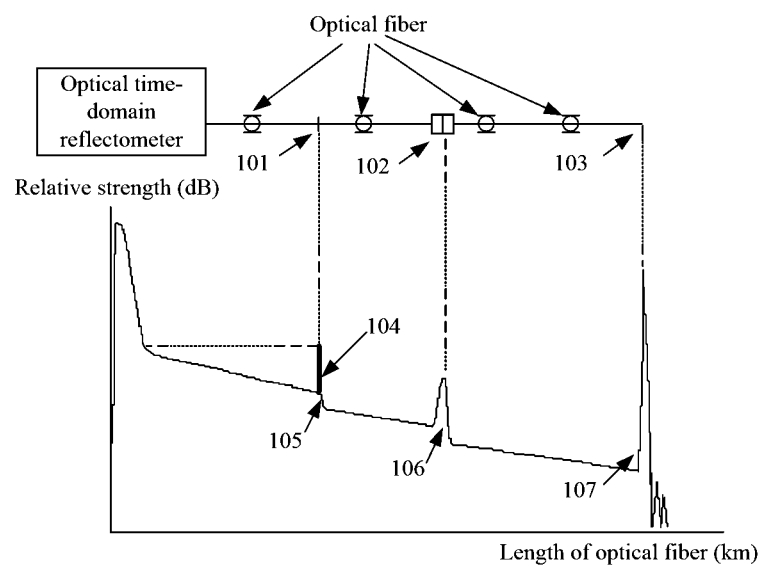
FIG. 1 is a typical schematic diagram showing an expression form of an optical time-domain reflectometry detection signal curve.
Figure 2A:
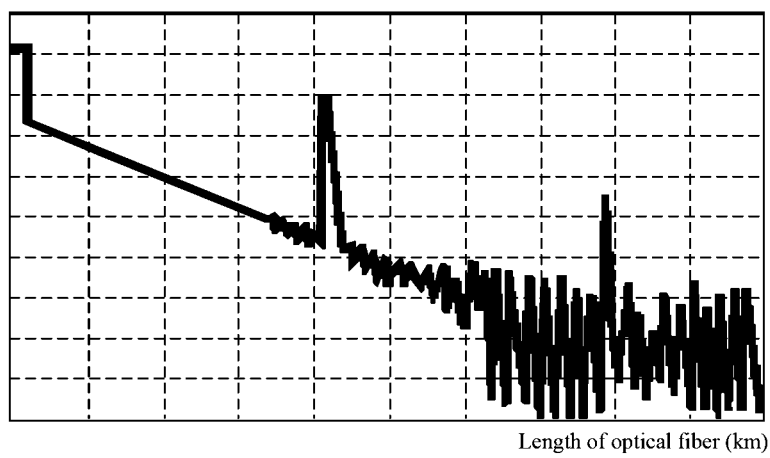
FIG. 2a is a schematic diagram showing an OTDR measurement result with a small number of averaging times.
Figure 2B:
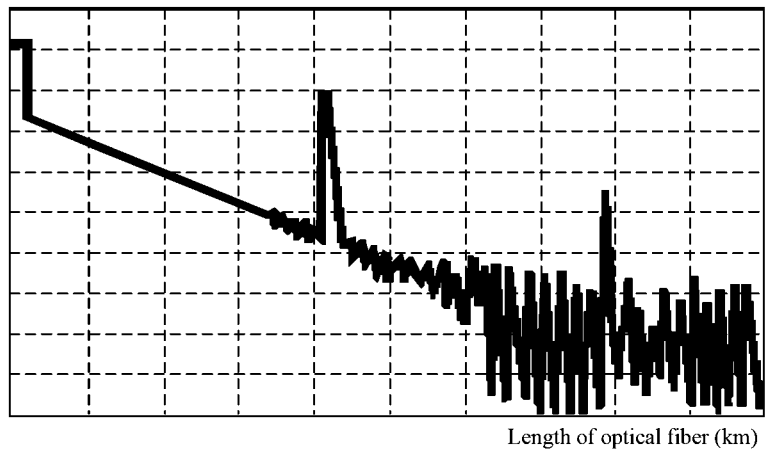
FIG. 2b is a schematic diagram showing an OTDR measurement result with a large number of averaging times.
Figure 3:
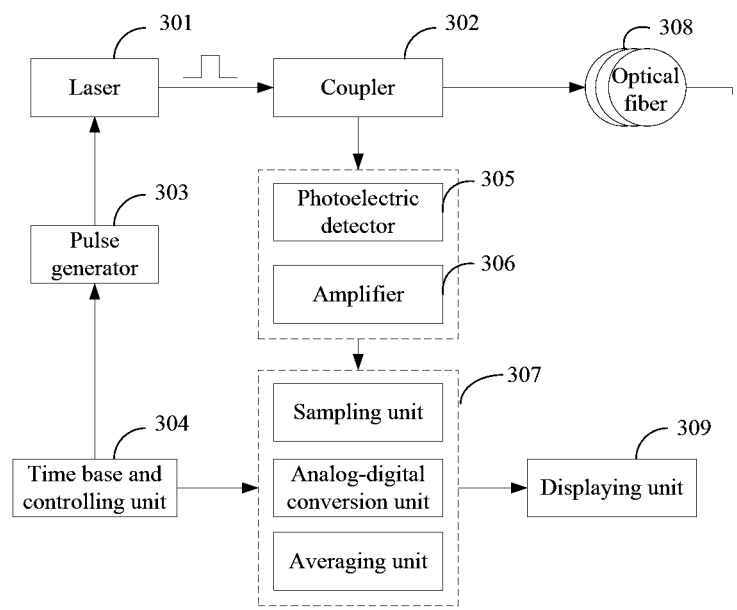
FIG. 3 is a schematic structural block diagram of an OTDR in the prior art.
Figure 4:
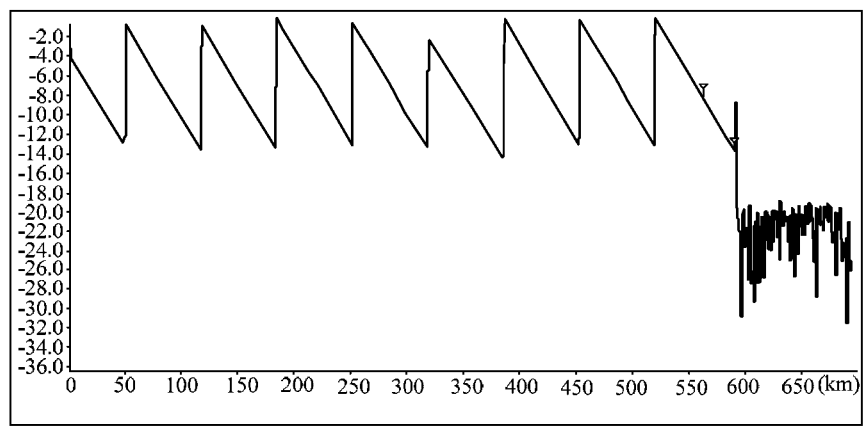
FIG. 4 is a schematic diagram showing an expression form of an OTDR signal in a submarine cable system.
Figure 5:
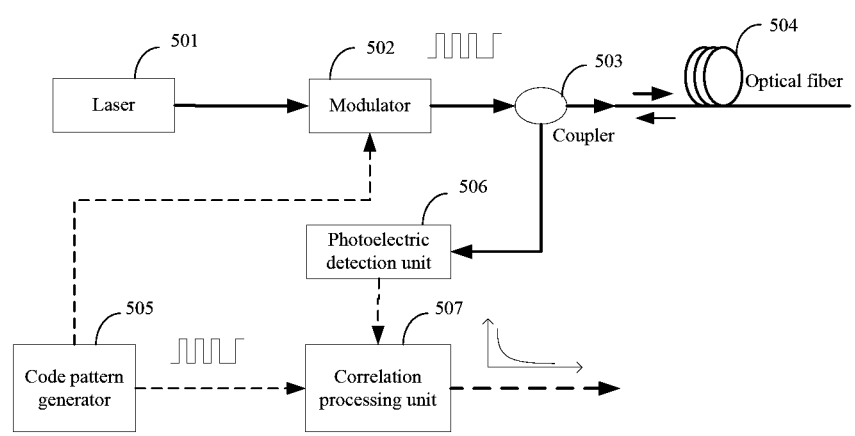
FIG. 5 is a schematic structural block diagram of a correlation OTDR in the prior art.
Figure 6:
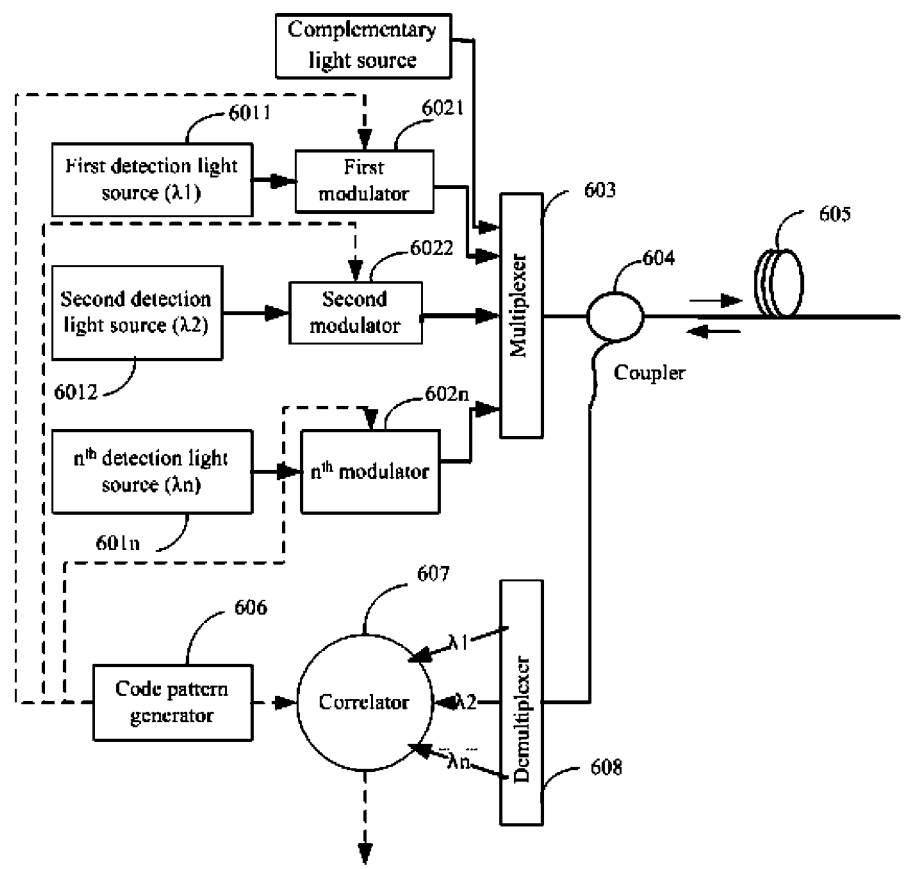
FIG. 6 is a block diagram of a high-efficiency correlation OTDR signal detection apparatus according to an embodiment of the present invention.

A high-efficiency correlation OTDR signal detection apparatus proposed by an embodiment of the present invention is shown in FIG. 6. The biggest difference of the correlation OTDR signal detection apparatus, compared with the prior art, lies in that more than two detection light sources are used, such as a first detection light source 6011, a second detection light source 6012, ..., and an $n^{th}$ detection light source 601n shown in FIG. 6. The n detection light sources have different wavelengths which are respectively $\lambda 1, \lambda 2, \ldots,$ and $\lambda n$. The optical signal from each detection light source is modulated respectively by a corresponding modulator. A code pattern generator 606 is configured to generate a correlation code pattern sequence required by each modulator, and respectively input the correlation code pattern sequence into the corresponding modulator. The modulator modulates a detection optical signal transmitted by a corresponding detection light source into a pulse optical signal according to the input correlation code pattern sequence. The correlation code pattern sequence received by each modulator is complementary codes. The pulse optical signal having complementary power output by the n modulators is combined by a multiplexer 603 to form an optical signal of constant power, and after directional coupling by a coupler 604, is transmitted to an optical fiber 605 under test. The coupler 604 is further configured to collect a backscattered optical signal in the optical fiber 605. The backscattered optical signal is demultiplexed by a demultiplexer 608 into n optical signals having different wavelengths (the wavelengths are respectively $\lambda 1, \lambda 2, \ldots,$ and $\lambda n$), and then a correlator 607 performs correlation processing on the n received signals and the code pattern sequence from the code pattern generator 606 to restore an OTDR signal.

The solutions of the present invention are further described in detail by using a code pattern generator 606 generating unipolar Gray codes as an example.

The process of Gray correlation operation is briefly described as follows:

Bipolar Gray codes (which consist of −1 and +1, have an adjustable length, and are normally 64-bit or 128-bit) include two groups, namely, Ga and Gb.

Unipolar Gray codes (which consist of 0 and 1 because optical signals do not have negative signals) are derived from bipolar Gray codes, and include four groups:

$Ka1=(1+Ga)/2$ $Ka2=(1-Ga)/2$ $Kb1=(1+Gb)/2$ $Kb2=(1-Gb)/2$

Because four groups of unipolar Gray codes need to be transmitted, detection light sources of four wavelengths need to be used, where the wavelengths are respectively λ1, λ2, λ3, and λ4. The code pattern generator 606 controls the modulators to modulate a detection optical signal transmitted by the four detection light sources into four groups of unipolar Gray codes (Ka1, Ka2, Kb1, and Kb2). According to the characteristic that the Gray codes are complementary codes, it can be known that the four groups of codes may ensure constant total optical power after being combined by the multiplexer. Scattered and reflected optical signals corresponding to the a detection optical signal of the wavelengths may be obtained by using a demultiplexer. Sampled data sets of scattered and reflected optical signals corresponding to the four groups of unipolar Gray codes (Ka1, Ka2, Kb1, and Kb2) are respectively (Ra1, Ra2, Rb1, and Rb2). Because of different optical fiber lengths and sampling rates of analog-digital conversion, the number of data points included in the four groups of sampled data sets is different. A transmission distance indicated by an interval between every two data points may be calculated based on the speed of the optical signal and the sampling rate.

The correlator may perform correlation operation in parallel on the sampled data sets of the four scattered and reflected optical signals. The process of correlation processing on the received signals is as follows.

The four groups of sampled data sets are divided into two pairs (Ra1, Ra2) and (Rb1, Rb2), and a subtracting operation is performed on each pair to obtain Ra and Rb:

$$Ra = Ra1 - Ra2;$$

$$Rb = Rb1 - Rb2;$$

Then, a correlation operation is respectively performed on Ra and Rb with signals Ga and Gb, thereby obtaining signals Rsa and Rsb:

$$Rsa = Ra \otimes Ga$$

where the sign ⊗ indicates a "correlation operation" in mathematics.

$$Rsb = Rb \otimes Gb$$

The signals Rsa and RsB are added to obtain Rs:

$$Rs = Rsa + Rsb;$$

Rs is restored to an OTDR signal after some further auxiliary processing.

The variables Ga, Gb, Kai, Kbi, Rai, Ra, Rsa, Rsb, and Rs (where i=1 or 2) described above are vectors.

Figure 7:
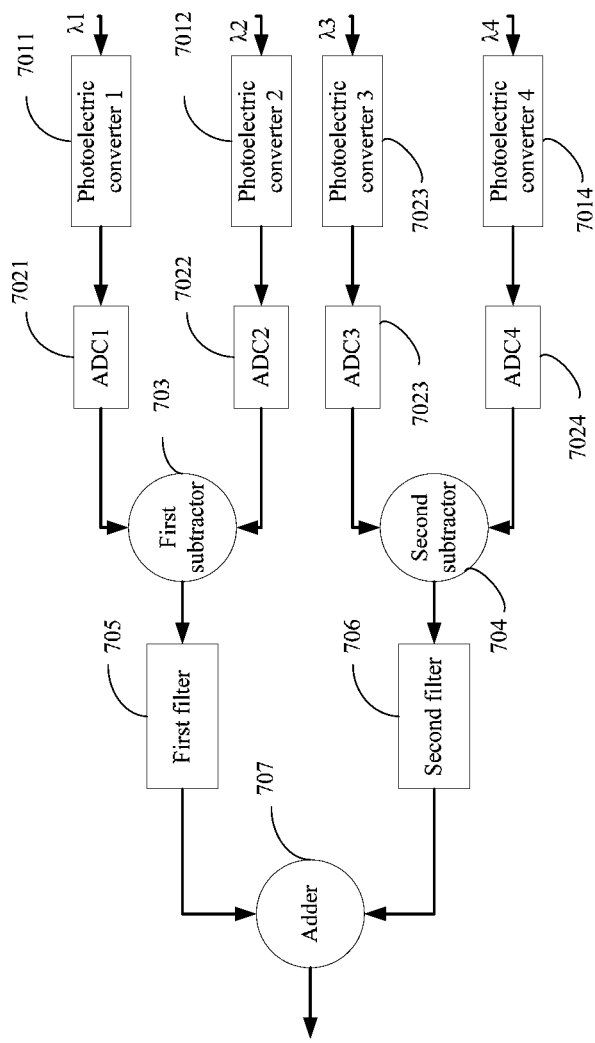
FIG. 7 is a schematic diagram of a correlator 607 shown in FIG. 6.

The principle of the correlator 607 is shown in FIG. 7. Four optical signals are respectively converted into electrical signals by using a photoelectric converter, and then converted into digital electrical signals by using an analog-digital converter (ADC). A first digital electrical signal (Ra1) and a second digital electrical signal (Ra2) are processed by a first subtractor 703, and then filtered by a first filter 705 to obtain a signal Rsa; a third digital electrical signal (Rb1) and a fourth digital electrical signal (Rb2) are processed by a second subtractor 704, and then filtered by a second filter 706 to obtain a signal Rsb. The signal Rsa and the signal Rsb are input into an adder 707 to obtain a signal Rs. The signal Rs undergoes some further auxiliary processing to obtain an OTDR signal.

In the technical solution according to the embodiment of the present invention, the correlator 607 is capable of completing a correlation process of Gray codes, and may perform correlation processing on data collected at any time in real time. The first filter 705 and the second filter 706 are digital filters designed according to bipolar Gray codes Ga and Gb; for the data, going through the first filter 705 is equivalent to a correlation operation with the Gray code Ga, and an output signal of the first filter 705 is a correlation coefficient obtained from the correlation operation. Similarly, for the data, going through the second filter 706 is equivalent to a correlation operation with the Gray code Gb. The entire process does not require multiple groups of sampled data to be pre-stored, and is capable of performing operations in real time and finally outputting restored OTDR signals.

An optical amplifier in a submarine cable system and an optical amplifier in a repeater of a submarine cable receive only an optical input of constant power; therefore, when the code pattern generator 606 uses other code patterns which are not complementary, in order to use the OTDR signal detection apparatus for detection for the submarine cable system, a complementary light source needs to be added in the OTDR signal detection apparatus. A complementary optical signal transmitted by the complementary light source is combined with the n detection optical signals, and then input into an optical fiber under test, thereby ensuring constant total power to be input into the optical fiber under test.

The solutions of the present invention are described merely by using a code pattern generator 606 generating unipolar Gray codes as an example. Persons skilled in the art, inspired by the above embodiment, may replace the unipolar Gray codes with other code pattern sequences having correlation. If the code pattern sequence is complementary codes, no complementary light source is required.

An embodiment of the present invention further proposes an optical time-domain reflectometry signal detection method, including the following steps:

A. modulating, under the control of a correlation code pattern sequence respectively, n detection optical signals transmitted by detection light sources of different wavelengths into n pulse optical signals, where n is a natural number greater than or equal to 2;

B. combining the n pulse optical signals and outputting a detection optical signal to an optical fiber under test;

C. receiving a backscattered optical signal from the optical fiber under test and dividing the backscattered optical signal into n optical signals according to wavelengths; and D. performing correlation processing on the n optical signals according to the correlation code pattern sequence and outputting a correlation optical time-domain reflectometry signal.

Preferably, the correlation code pattern sequence for modulating every detection optical signal is complementary codes. In such cases, a detection optical signal output to an optical fiber under test has constant power.

The foregoing descriptions are merely exemplary embodiments of the present invention, but are not intended to limit the present invention. Any modification, equivalent replacement, or improvement made within the spirit and principle of the present invention should fall within the protection scope of the present invention.

What is claimed is:

1. An optical time-domain reflectometry signal detection apparatus, comprising n detection light sources of different wavelengths, and n modulators, a multiplexer, a coupler, a demultiplexer, a correlator, and a code pattern generator, wherein n is a natural number greater than or equal to 2, and wherein the code pattern generator is configured to generate a correlation code pattern sequence, and input the correlation code pattern sequence to the n modulators and the correlator;

each of the modulators is configured to modulate a detection optical signal transmitted by a corresponding detection light source into a pulse optical signal;

the multiplexer is configured to combine n pulse optical signals transmitted by the n modulators and output a detection optical signal;

the coupler is configured to perform directional coupling on the detection optical signal output by the multiplexer and send the detection optical signal output by the multiplexer to an optical fiber under test; and receive a backscattered optical signal from the optical fiber under test and send the backscattered optical signal to the demultiplexer;

the demultiplexer is configured to divide the backscattered optical signal from the coupler into n optical signals according to wavelengths; and the correlator is configured to perform, according to the correlation code pattern sequence from the code pattern generator, correlation processing on the n optical signals output by the demultiplexer and output a correlation optical time-domain reflectometry signal;

wherein the correlation code pattern sequence received by each modulator is a noncomplementary code;

wherein the detection apparatus further comprises a complementary light source configured to transmit a complementary optical signal; and wherein the multiplexer combines the complementary optical signal with the n pulse optical signals transmitted by the n modulators and output a detection optical signal of constant power.

2. An optical time-domain reflectometry signal detection method, comprising:

modulating, under control of a correlation code pattern sequence, n detection optical signals transmitted by detection light sources of different wavelengths into n pulse optical signals, wherein n is a natural number greater than or equal to 2;

combining the n pulse optical signals and outputting a detection optical signal to an optical fiber under test;

receiving a backscattered optical signal from the optical fiber under test and dividing the backscattered optical signal into n optical signals according to wavelengths; and performing correlation processing on the n optical signals according to the correlation code pattern sequence and outputting a correlation optical time-domain reflectometry signals wherein the correlation code pattern sequence used for modulating every detection optical signal is a noncomplementary code, and the combining the n pulse optical signals comprises:

combining the n pulse optical signals with a complementary optical signal transmitted by a complementary light source to obtain a detection optical signal having constant power.

* * * * *

UNITED STATES PATENT AND TRADEMARK OFFICE
CERTIFICATE OF CORRECTION

PATENT NO. : 9,194,763 B2  Page 1 of 1
APPLICATION NO. : 14/064838
DATED : November 24, 2015
INVENTOR(S) : Hu et al.

It is certified that error appears in the above-identified patent and that said Letters Patent is hereby corrected as shown below:

On the Title page, item 73 city/country of Assignee should read -- Tianjin (CN) --.

In the claims

Column 10, line 19, "signals" should read -- signal --.

Signed and Sealed this
Eighth Day of March, 2016

Michelle K. Lee
*Director of the United States Patent and Trademark Office*